(12) United States Patent
Banyai et al.

(10) Patent No.: US 7,038,920 B2
(45) Date of Patent: May 2, 2006

(54) SYSTEM TO MOUNT ELECTRICAL MODULES

(75) Inventors: Christopher J. Banyai, Chandler, AZ (US); Karl H. Mauritz, Chandler, AZ (US); Edward Butler, Chandler, AZ (US); Mark D. Summers, Phoenix, AZ (US)

(73) Assignee: Intel Corporation, Santa Clara, CA (US)

(*) Notice: Subject to any disclaimer, the term of this patent is extended or adjusted under 35 U.S.C. 154(b) by 343 days.

(21) Appl. No.: 10/610,097

(22) Filed: Jun. 30, 2003

(65) Prior Publication Data

US 2004/0264157 A1 Dec. 30, 2004

(51) Int. Cl.
*H05K 1/11* (2006.01)
*H05K 1/14* (2006.01)

(52) U.S. Cl. .................. 361/803; 361/785; 361/789; 439/67

(58) Field of Classification Search .............. 361/760, 361/720, 748–749, 789, 803; 439/77, 494, 439/637–638; 174/254–255
See application file for complete search history.

(56) References Cited

U.S. PATENT DOCUMENTS

| | | | | |
|---|---|---|---|---|
| 4,984,064 A | * | 1/1991 | Toshio et al. | 257/724 |
| 5,224,023 A | * | 6/1993 | Smith et al. | 361/784 |
| 5,564,931 A | * | 10/1996 | Fabian et al. | 439/62 |
| 5,703,760 A | | 12/1997 | Zhu | |
| 6,302,704 B1 | | 10/2001 | Belanger, Jr. | |
| 6,477,614 B1 | * | 11/2002 | Leddige et al. | 711/5 |
| 6,498,731 B1 | * | 12/2002 | Roscoe et al. | 361/796 |
| 6,765,800 B1 | * | 7/2004 | Haba et al. | 361/760 |
| 2002/0181214 A1 | | 12/2002 | Levy et al. | |

* cited by examiner

*Primary Examiner*—Kamand Cuneo
*Assistant Examiner*—Tuan Dinh
(74) *Attorney, Agent, or Firm*—Buckley, Maschoff & Talwalkar LLC

(57) ABSTRACT

According to some embodiments, a system includes a holder to hold an electrical module, the module having an electrical circuit and a conductive module pad electrically coupled to the electrical circuit. A system may also include a flexible circuit coupled to the holder and having a conductive pad to contact the conductive module pad.

19 Claims, 9 Drawing Sheets

2 : HEAD
3 : SHANK
9 : COATING MEMBER
10 : THREAD

2 : HEAD
3 : SHANK
9 : COATING MEMBER
10 : THREAD

SYSTEM TO MOUNT ELECTRICAL MODULES

BACKGROUND

Card edge connectors may be used to hold electrical modules such as Dual In-Line Memory Modules and to electrically couple such modules to a bus. A vertical card edge connector holds an electrical module in a vertical position. Vertical card edge connectors are unsuitable for some small form factor applications because the total height of the connector/module combination exceeds the applications' specifications. An angled card connector may be used to reduce the height of the connector/module combination. For a given electrical module, a height of a connector/module combination will be less if an angled card edge connector is used than if a vertical card edge connector is used.

The electrical coupling that is provided by a conventional card edge connector may be inadequate for some applications. For example, the coupling between a bus and an electrical module might not provide suitable signal integrity at high bus speeds, thereby limiting the maximum speed at which the bus should operate. The signal integrity provided by the coupling may also limit the number of electrical modules that can be effectively supported by the bus.

DETAILED DESCRIPTION

Figure 1:
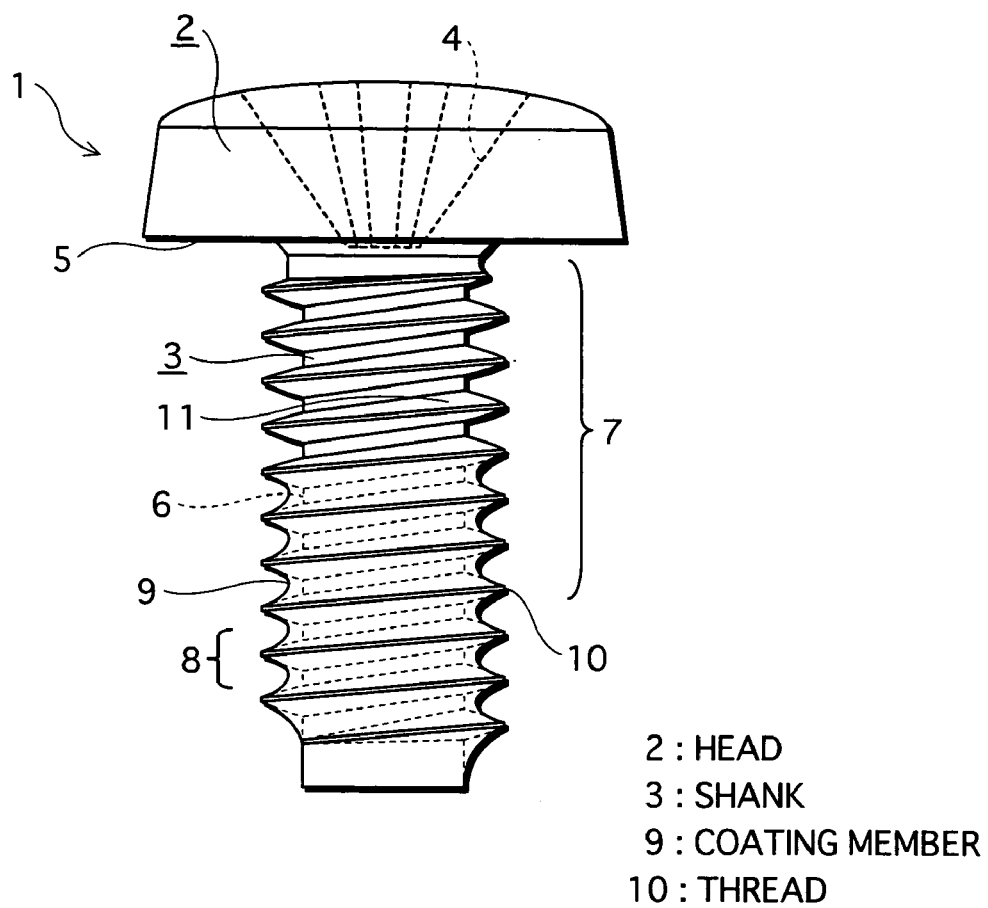
FIG. 1 is a side view of a system according to some embodiments.

FIG. 1 illustrates a system according to some embodiments. FIG. 1 shows holders 10 and 15, which comprise angled card edge connectors. Each of holders 10 and 15 holds a respective one of electrical modules 20 and 25 in an opening defined thereby. Disposed between each electrical module and its respective holder is flexible circuit 30. According to some embodiments, flexible circuit 30 is mechanically coupled to holders 10 and 15.

As will be described in more detail below, each of electrical modules 20 and 25 may comprise an electrical circuit and a conductive module pad electrically coupled to the electrical circuit. Flexible circuit 30 may include corresponding conductive pads that contact the conductive module pads of electrical modules 20 and 25 when arranged as shown in FIG. 1. Electrical properties of such an arrangement may allow more electrical modules per channel than conventional arrangements.

Holders 10 and 15 are mounted on substrate 40. Substrate 40 may comprise a printed circuit motherboard for a computing device such as a server. Also mounted on substrate 40 is connection 50. Connection 50 may comprise solder balls, pins, lead fingers, and/or other elements used to electrically couple connection 50 to pads, through-holes, and/or clamping connectors of substrate 40. These elements of substrate 40 may in turn be electrically coupled to signal lines (not shown). The signal lines may comprise a parallel memory bus, a serial memory bus, or any other bus.

Connection 50 is also coupled to flexible circuit 30. In a specific example, flexible circuit 30 comprises solder balls, pins, lead fingers, and/or other elements used to electrically couple flexible circuit 30 to corresponding elements of connection 50. In view of the above-described arrangement, some embodiments provide electrical coupling between signal lines of substrate 40 and electrical circuits of modules 20 and 25. Holders 10 and 15 are therefore not electrically coupled to modules 20 and 25 and/or to flexible circuit 30 in some embodiments. In other embodiments, holders 10 and 15 may include pins, lead fingers and/or other systems for transmitting signals/power between substrate 40 and modules 20 and 25. The former embodiments may allow the use of holders that are smaller than those usable in conjunction with the latter embodiments.

Connection 50 may also comprise a package containing one or more integrated circuits to which the conductive pads of circuit 30 may be coupled. Such embodiments may provide communication between the one or more integrated circuits and modules 20 and 25, or between the one or more integrated circuits and other integrated circuit(s) to which flexible circuit 30 is coupled.

Figure 2:
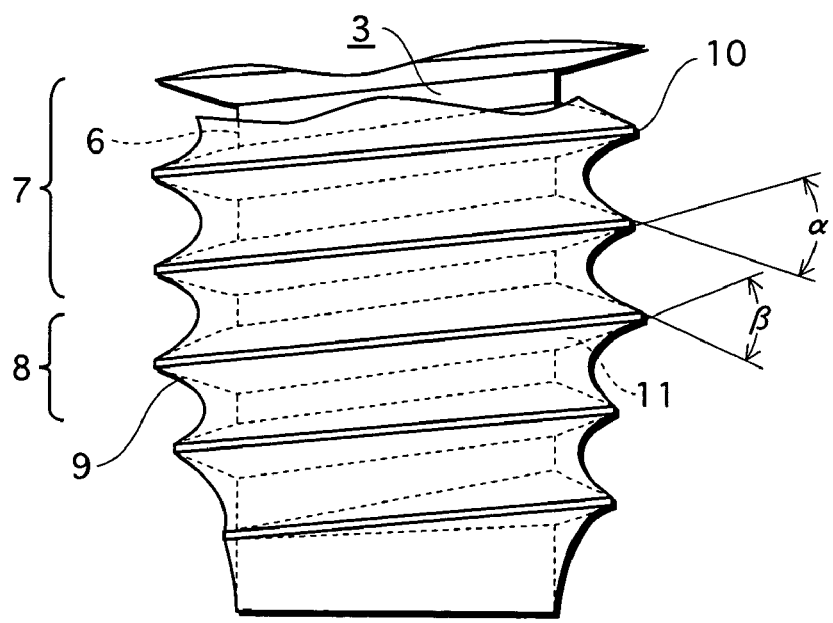
FIG. 2 is a top view of a flexible circuit according to some embodiments.

FIG. 2 is a top view of flexible circuit 30 according to some embodiments. Flexible circuit 30 of FIG. 2 comprises conductive elements 32 that define through holes or balls. The through holes (or balls) may receive pins of connection 50 and thereby electrically couple connection 50 to conductors within circuit 30. In some embodiments, circuit 30 also includes conductive elements at an opposite end from elements 32 to drive signals off the opposite end, such as signals to a repeater. Circuit 30 also includes two sets of conductive pads 34 to contact the above-mentioned conductive module pads of modules 20 and 25. Circuit 30 may include any number of conductive elements 32, conductive pads 34, and sets of conductive pads according to some embodiments.

Figure 3:
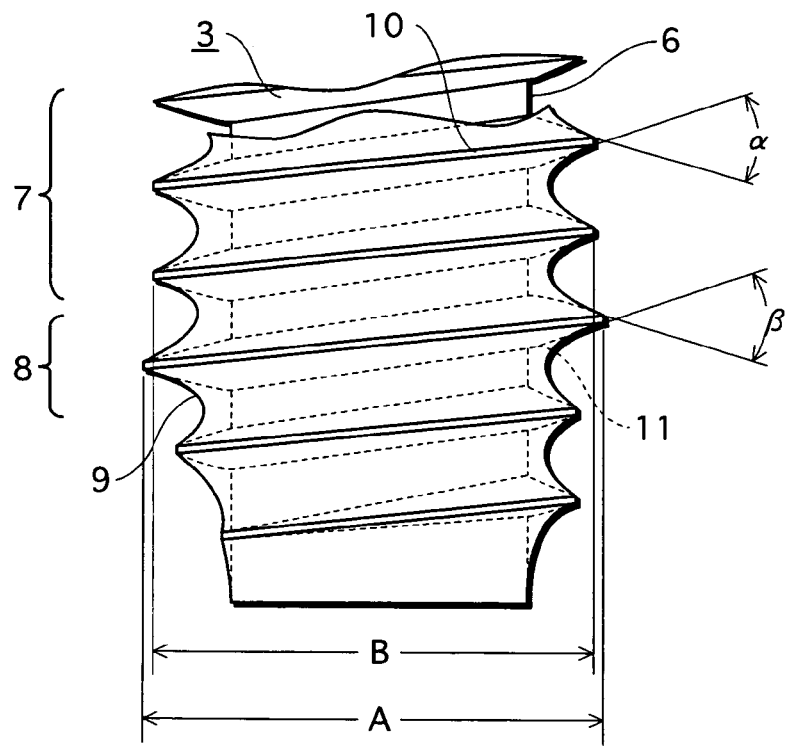
FIG. 3 is a plan view of a dual in-line memory module.

More particularly, FIG. 3 is a view of an electrical module that may be used in conjunction with some embodiments. Module 20 is a Double Data Rate Dual In-Line Memory Module (DIMM) which includes integrated circuits 21, conductive module pads (or lead fingers) 22 and mounting structures 23. Although FIG. 2 illustrates only one side of module 20, the unshown side also includes additional conductive module pads 22 and may include additional integrated circuits 21.

One set of conductive pads 34 may therefore contact respective ones of module pads 22 on either side of module 20 in a case that module 20 and circuit 30 are received in holder 10. In some embodiments, one or more sets of conductive pads 34 are located on both sides of flexible circuit 30. Such an arrangement may provide more design flexibility and/or the ability to increase a number of modules that can be placed in a particular area.

Holder 10 may include structures corresponding to mounting structures 23 that enable a secure physical connection between holder 10 and module 20. Holder 10 may also comprise structures such as pins to engage housing 36 of flexible circuit 30 through holes 38 defined thereby. Housing 36 may comprise a sheath, substrate, or the like surrounding and/or otherwise supporting conductors of flexible circuit 30.

Other types of electrical modules which differ in electrical function, physical configuration or otherwise from module 20 may be used in conjunction with some embodiments. Module 20 may be a Double Data Rate DIMM with a different physical configuration, a Single Data Rate or a Quad Data Rate DIMM with a same or different physical configuration, another type of memory module such as a Single In-Line Memory Module (SIMM), and/or a module having a same or different physical configuration that provides a function other than memory storage. Other non-exhaustive examples, include ROM and PROM memory modules, hub links, network cards, CPU cards and Fabric connections. Module 20 may be mounted vertically, at an angle, or horizontally.

Figure 4:
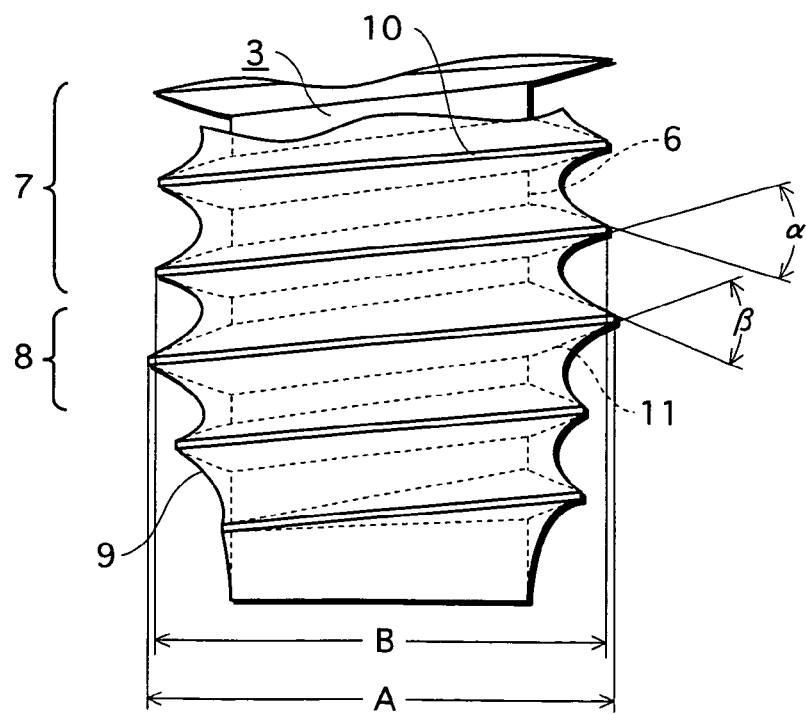
FIG. 4 is a cutaway view of a flexible circuit according to some embodiments.

FIG. 4 is a cutaway view of some elements of flexible circuit 30 according to some embodiments. As shown, flexible circuit 30 may comprise several layers of conductors and dielectrics. Of course, some embodiments employ different configurations. The illustrated embodiment includes a solder mask, two power planes, two ground planes, two signal layers, and dielectrics of various thicknesses and dielectric constants disposed therebetween. The planes and signal layers may comprise copper. Any suitable currently- or hereafter-known system for carrying electrical signals may be used in conjunction with some embodiments.

Conductive pads 34 are disposed on the solder mask. Pads 34 may comprise Gold plating over Nickel under plating and may be raised above the solder mask to provide good contact with conductive device pads 22. Pads 34 may also or alternatively comprise conductive contacts soldered onto the solder mask. In some embodiments, pads 34 are flush with or recessed with respect to the solder mask, depending upon the configuration of conductive device pads 22. Shown within each pad is an indication of a VIA 39, which electrically couples its respective pad to one or more of the conductors of circuit 30. The foregoing arrangement may electrically couple signal lines of substrate 40 to conductive device pads 22 of electrical module 20.

In some embodiments, the top and bottom layers include thin dielectric layers to Ground so as to increase the capacitance and therefore decrease the impedance of power connection to modules coupled to circuit 30. Some embodiments provide unique signal integrity properties and cost advantages. Accordingly, some embodiments utilize flexible circuit 30 for high performance busses and the low-cost FR4 PCB for mechanical mounting and low performance functions including power delivery.

Figure 5:
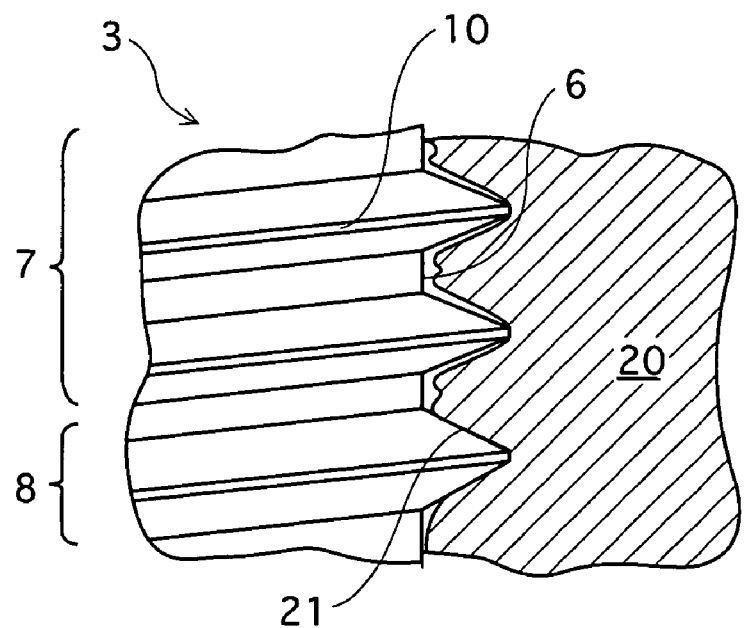
FIG. 5 is a plan view of a flexible circuit according to some embodiments.
Figure 6:
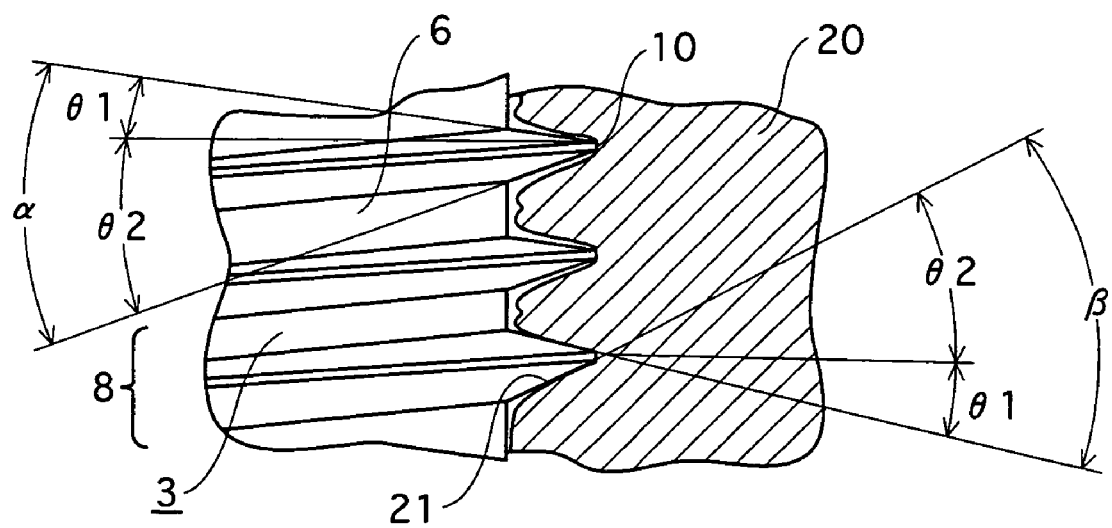
FIG. 6 is a plan view of a module holder according to some embodiments.
Figure 7:
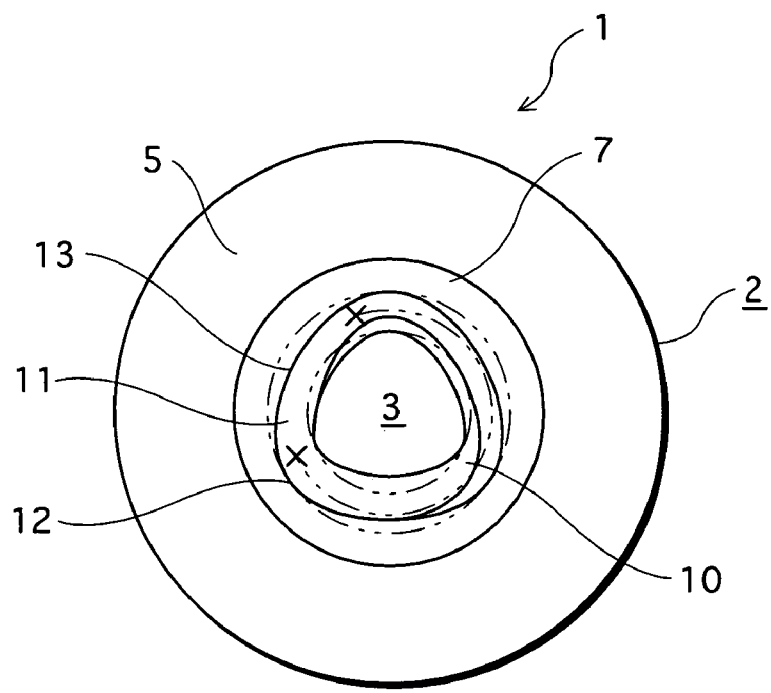
FIG. 7 is a cutaway view of a module holder according to some embodiments.

FIG. 5 is a plan view of flexible circuit 60 according to some embodiments. Flexible circuit 60 is shaped to mechanically engage holder 70 of FIG. 6. FIG. 7 is a cutaway view of holder 70 for showing structures with which circuit 60 may engage.

Flexible circuit 60 may comprise those elements described above with respect to flexible circuit 30. More particularly, flexible circuit 60 may comprise conductive elements 32 to electrically couple conductors within circuit 60 to signal lines of a printed circuit board on which holder 70 is mounted. In this regard, FIG. 8 is a view of flexible circuit 60, holder 70, substrate 40, and six electrical modules 20 in combination according to some embodiments.

Figure 8:
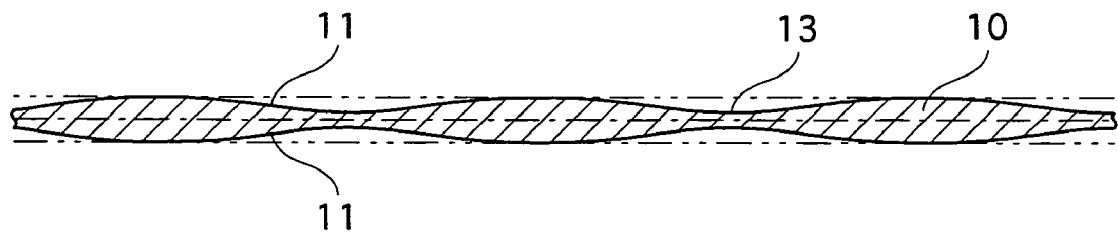
FIG. 8 is a plan view of a system according to some embodiments.
Figure 9:
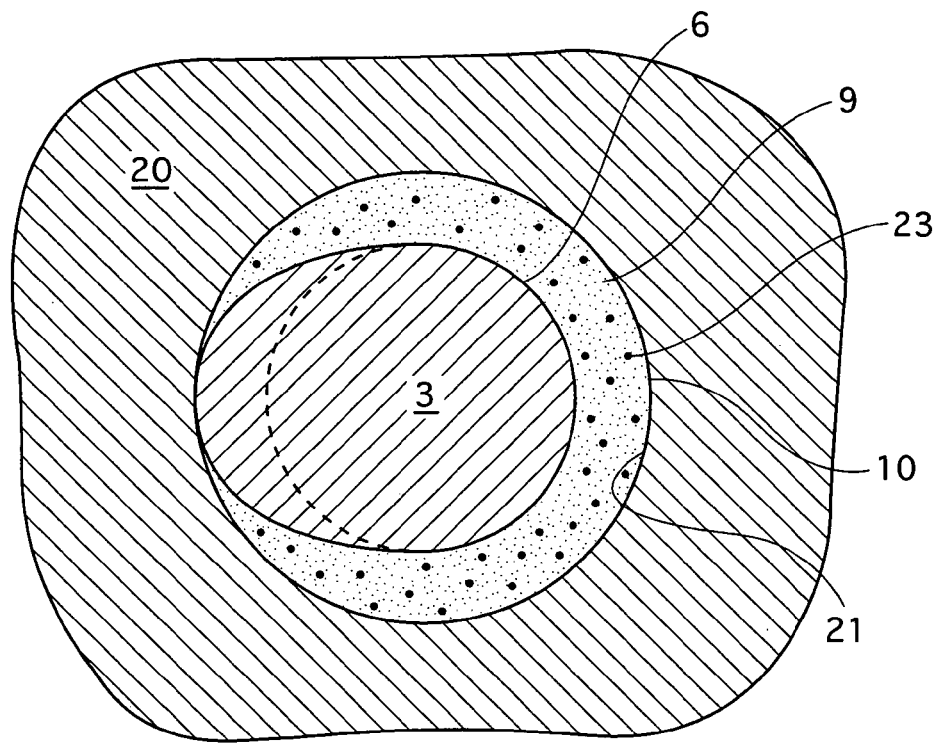
FIG. 9 is a cutaway view of a system according to some embodiments.
Figure 10:
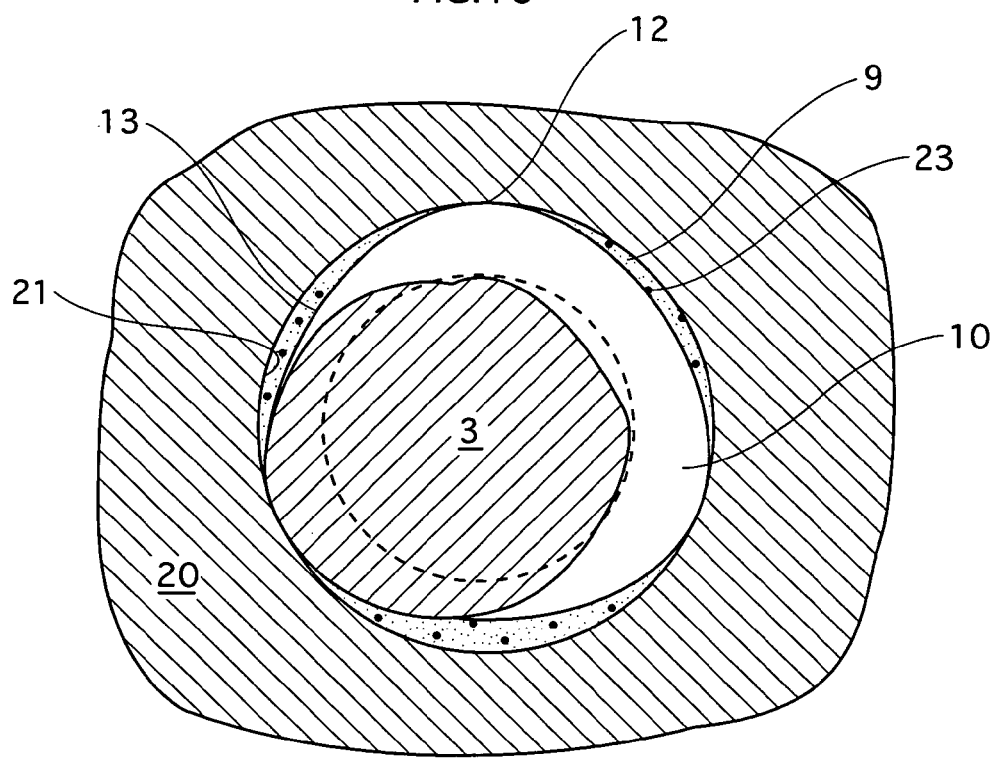
FIG. 10 is a close-up cutaway view of a system according to some embodiments.

FIG. 9 is a side cutaway of the FIG. 8 system showing modules 20 received in openings defined by flexible circuit 60/holder 70. FIG. 10 illustrates such openings in greater detail. In particular, FIG. 10 shows resilient elements 75 of holder 70. Each of resilient elements 75 may comprise a bar of rubber, a conical spring, and/or other suitable resilient materials. Resilient elements 75 may operate to press conductive pads 34 of flexible circuit 60 against respective conductive module pads 22 of electrical modules 20.

Figure 11:
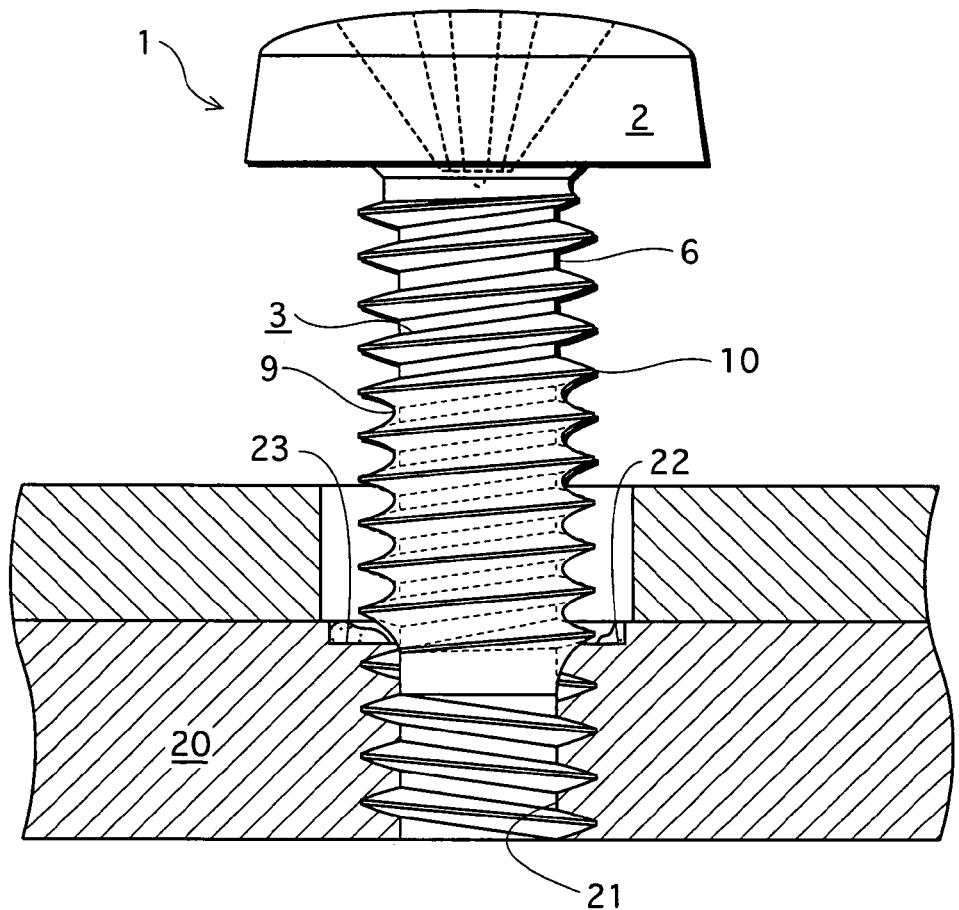
FIG. 11 is a detailed close-up cutaway view of a system according to some embodiments.

FIG. 11 illustrates the arrangement of resilient element 75, flexible circuit 60, conductive pad 34, and conductive module pad 22 within area 80 of FIG. 10 in even greater detail. As shown, flexible circuit 60 envelopes an outer surface of holder 70 and resilient element 75. Flexible circuit 60 may be bonded, pinch fit and/or otherwise mounted to holder 70.

Holder 70 defines opening 77 in which a portion of flexible circuit 60 is received. The portion includes conductive pad 34 as well as inner surface 65 adjacent to and facing opposite from conductive pad 34. Resilient element 75 contacts surface 65.

Module 20 and conductive module pad 22 are also received in opening 77. In the illustrated embodiment, resilient element 75 presses conductive pad 34 against conductive module pad 22. More particularly, conductive device pad 22 applies a force to flexible circuit 60, which in turn compresses resilient element 75 and causes resilient element 75 to generate a force that resists the compression.

In some embodiments such as that shown in FIG. 10, opening 77 also receives a second portion of flexible circuit 60 that includes a second conductive pad 34 and a second surface 65 adjacent to and facing opposite from the second conductive pad. Holder 70 includes a second resilient element 75 to contact the second surface 65, and the second resilient element 75 presses the second conductive pad 34 against a second conductive module pad 22 of the electrical module 20. The two resilient elements 75 may thereby operate to hold module 20 in opening 75.

Figure 12:
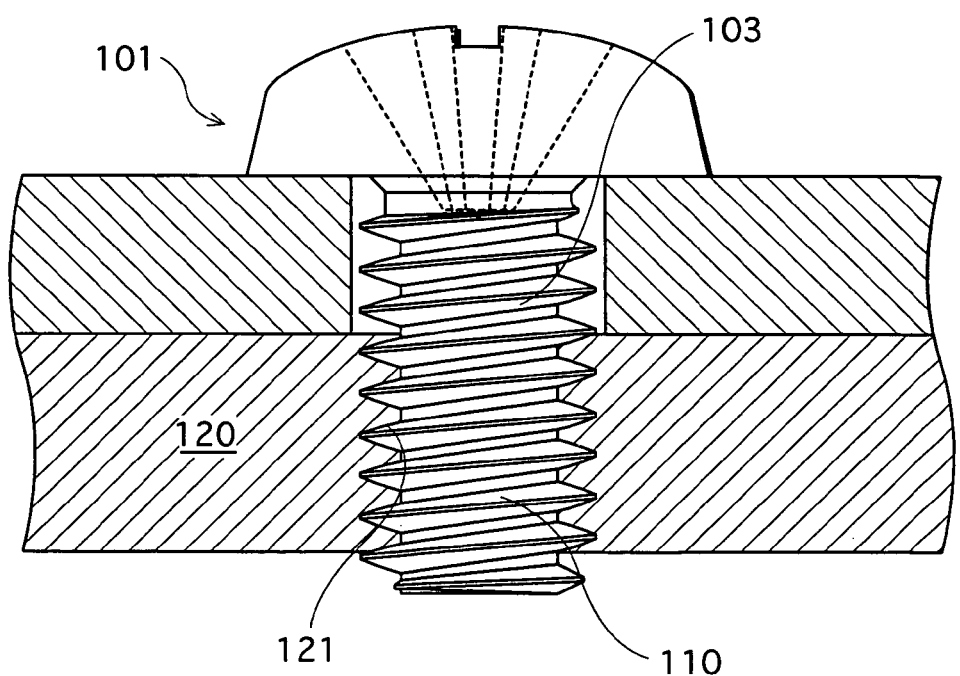
FIG. 12 is a block diagram of a system according to some embodiments.

FIG. 12 is a block diagram of system 100 according to some embodiments. System 100 may comprise a hardware server or other device. System 100 includes previously-described substrate 40 with several elements mounted thereon. These elements include processor 110, memory controller hub 120, and two instances each of flexible circuit 30 and memory modules/holders 10, 15, 20, and 25 of FIG. 1.

Memory controller hub 120 is coupled to processor 110, such as an Intel Xeon™ processor. Memory controller hub 120 is also coupled to each instance of flexible circuit 30. Although the coupling between hub 120 and circuits 30 appears to be direct, hub 120 may be coupled to signal lines within substrate 40 and circuits 30 may be electrically coupled to respective ones of the signal lines as described with respect to FIG. 1. In this regard, flexible circuits 30 may be mechanically and electrically coupled to memory modules/holders 10, 15, 20, and 25 as described with respect to FIG. 1. Such an arrangement may therefore provide processor 110 with access to memory storage within each instance of memory modules 20 and 25.

Figure 13:
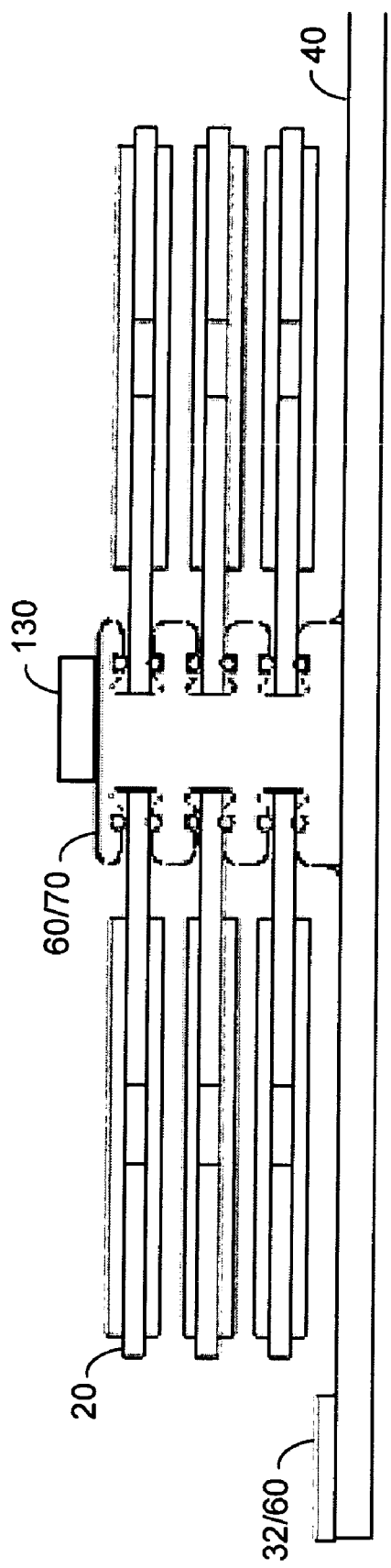
FIG. 13 is a cutaway view of a system according to some embodiments.

FIG. 13 illustrates a side cutaway view of a system according to some embodiments. The illustrated system may be identical to that shown in FIG. 9 except for the addition of device 130. Device 130 may be any active device for providing functions to a system including flexible circuit 60. In some examples, device 130 is an application-specific integrated circuit (ASIC) for providing memory repeater hub functions. Device 130 may be mounted to conductive pads provided on flexible circuit 60 for this purpose. Other devices may be mounted on flexible circuit 60 such as the devices shown in FIG. 12 to reduce platform form factors.

Figure 14:
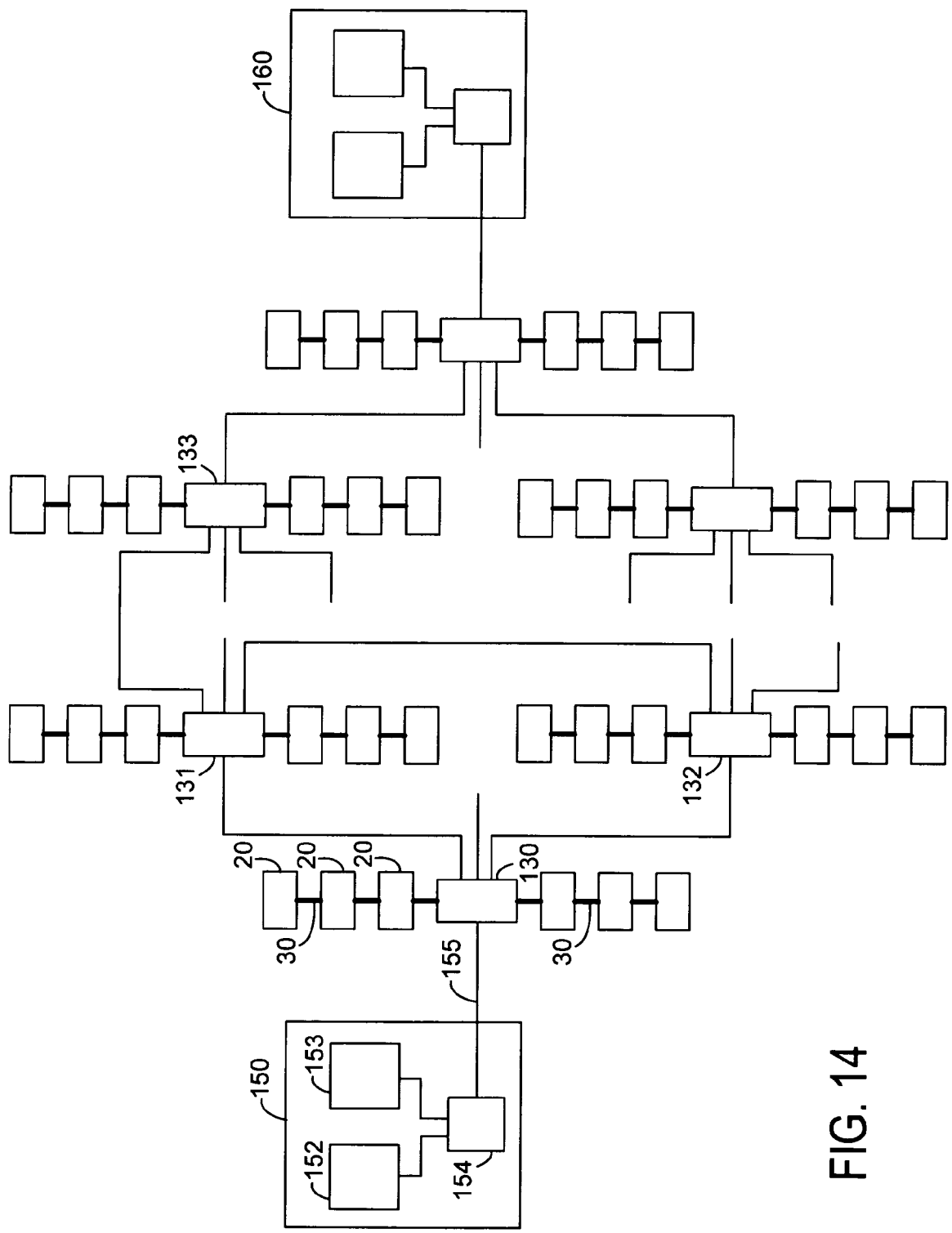
FIG. 14 is a diagram of a system architecture according to some embodiments.

FIG. 14 illustrates an architecture using the FIG. 13 system according to some embodiments. The architecture includes platform 150, which comprises microprocessors 152 and 153 coupled to memory controller hub 154. Memory controller hub 154 is coupled to device 130 by bus 155, which may be a high-speed serial bus such as the MultiPhasic Interface or other memory bus.

Device 130 may be coupled to modules 20 via flexible circuit 30 as described above. In some embodiments, device 130 provides "fan-out" memory repeater functions to devices 131 and 132. As shown in FIG. 14, device 130 may also provide repeater functions for a third device. Devices 131 and 132 may be identical to device 130, and may be coupled to respective modules 20 via respective instances of flexible circuit 30. Device 130 may be coupled to devices 131 and 132 via busses identical to bus 155 or via any other supported bus. Modules 20, device 130 and circuit 30 of FIG. 14 may be disposed in a "block" as shown in FIG. 13. Such an arrangement may allow grouping of blocks so as to provide redundancy and performance in a unified memory structure.

For example, FIG. 14 shows device 131 coupled to device 132. Such a coupling may provide platform 150 with redundant access to memory modules 20 coupled to devices 131 and 132. More particularly, the coupling provides a path from platform 150 to any memory modules 20 coupled to devices 131 and 132 in a case that either of the links between device 130 and device 131 or device 130 and device 132 fails. The coupling between device 131 and 133 provides platform 150 and platform 160 with access to shared memory.

Figure 15:
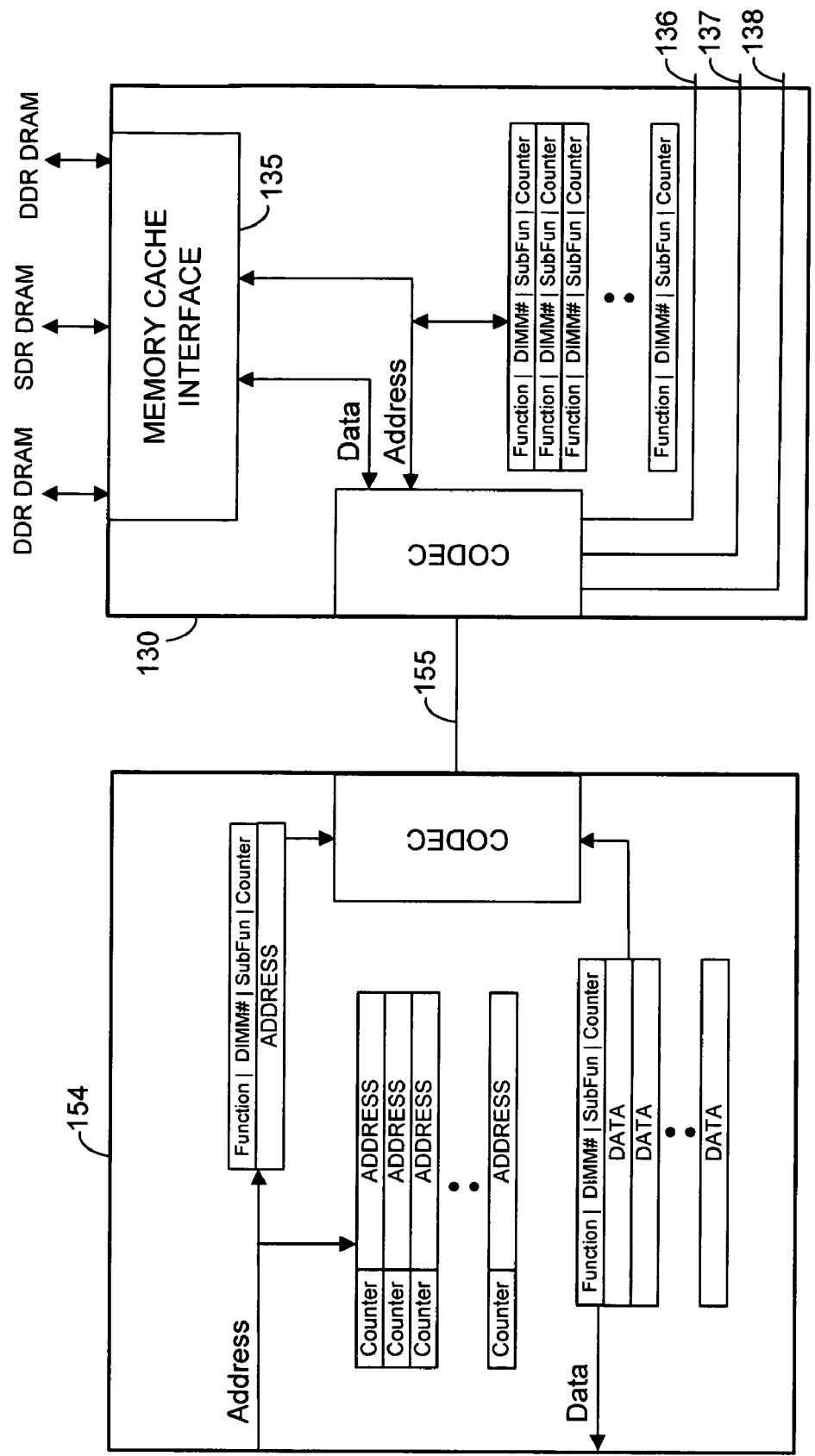
FIG. 15 is a block diagram of a memory controller hub and an ASIC according to some embodiments.
Figure 1:
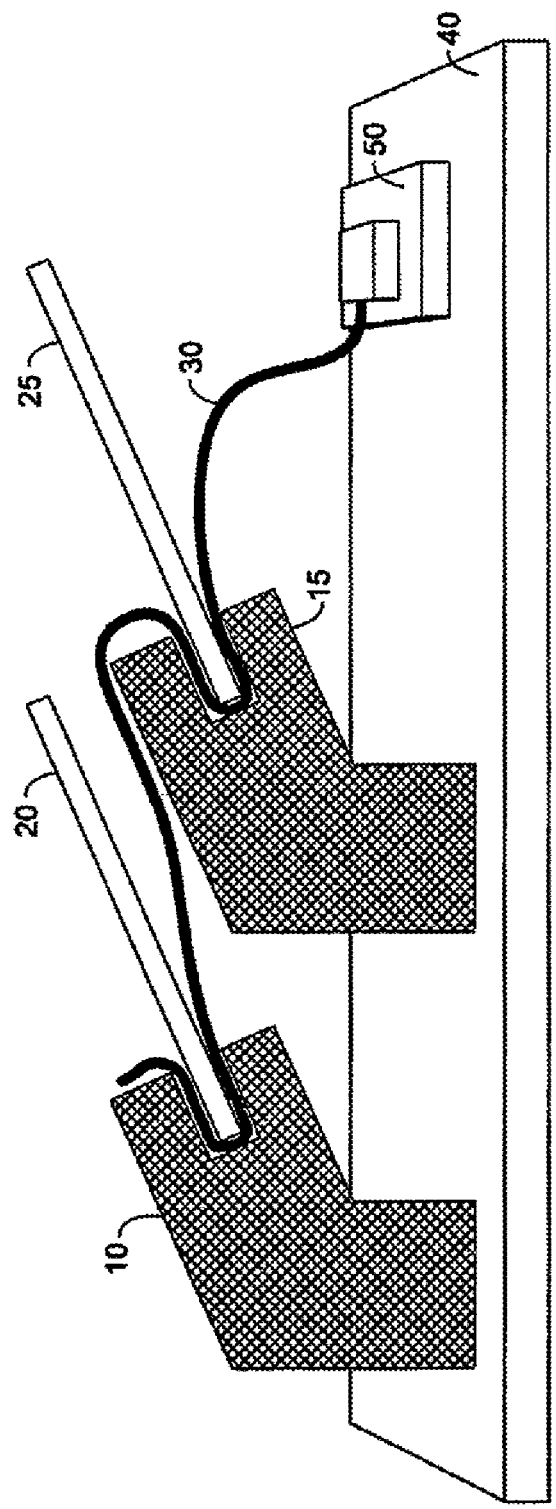
Figure 2:
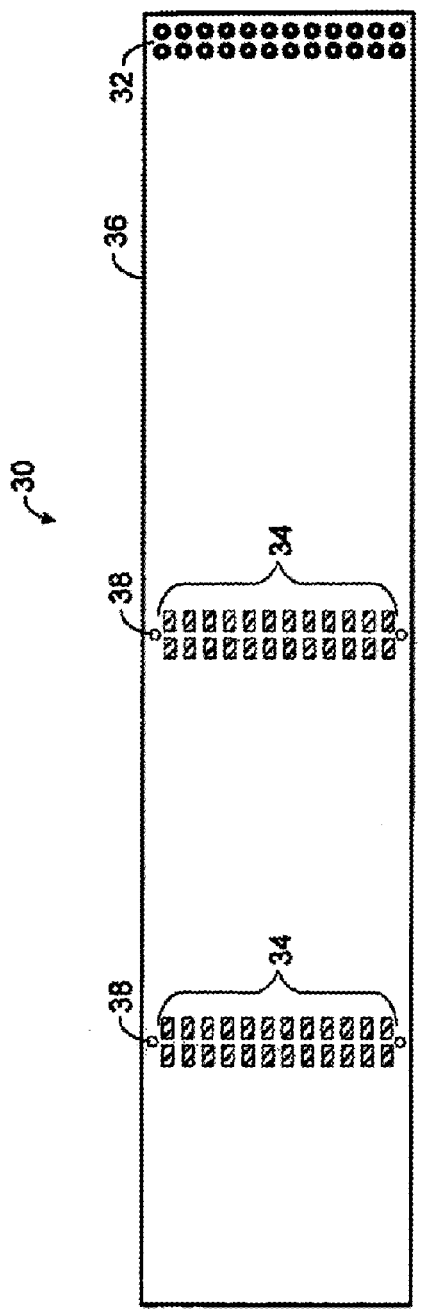
Figure 3:
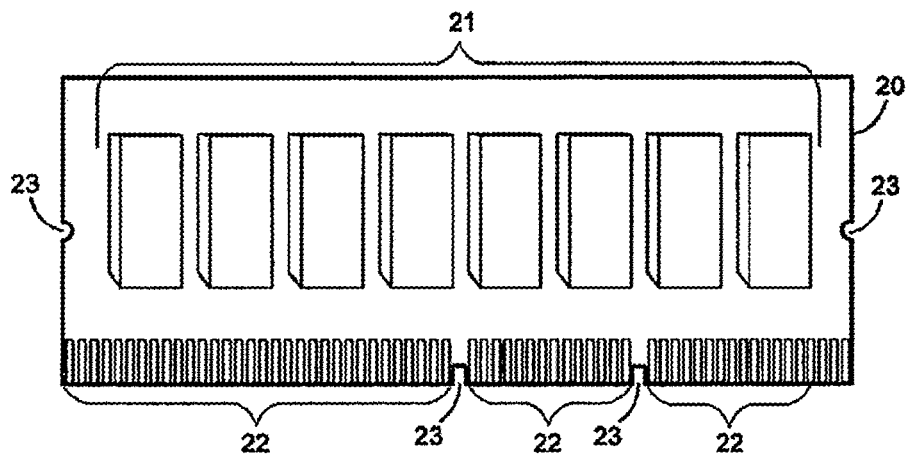
Figure 4:
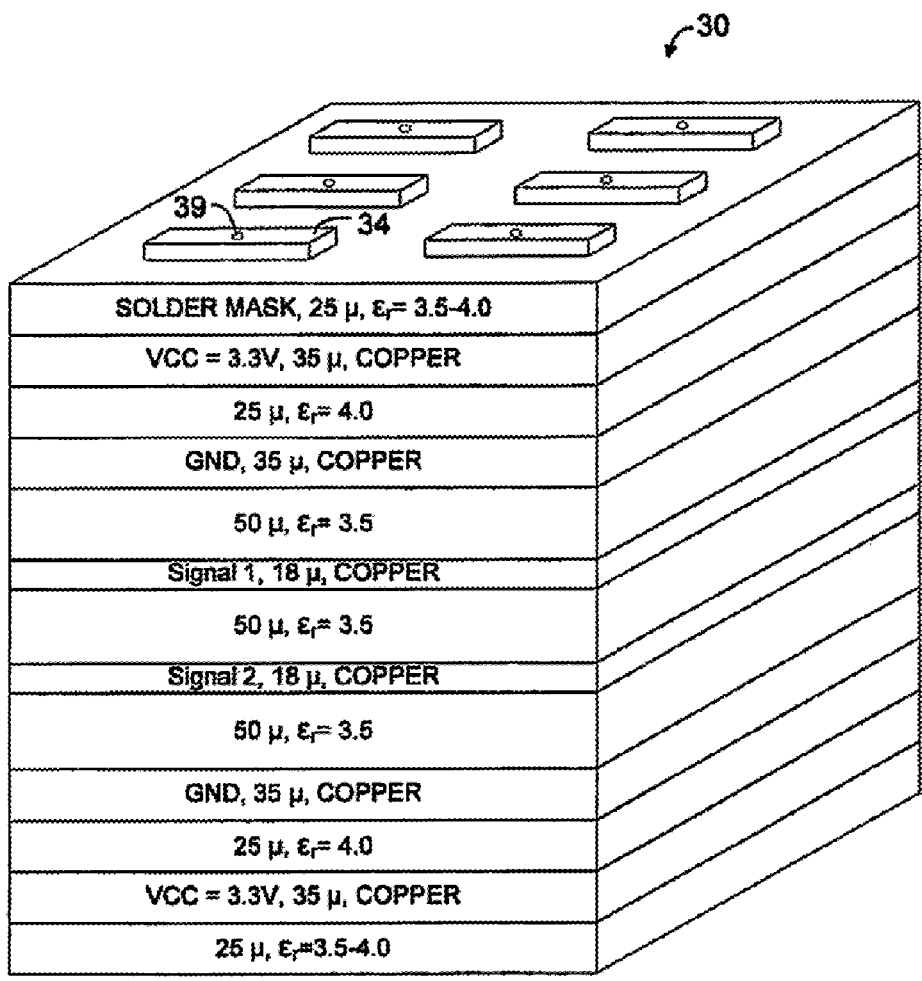
Figure 5:
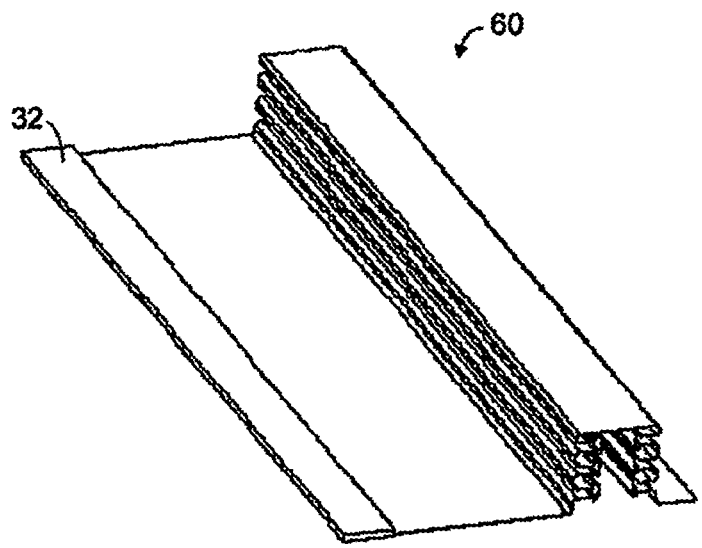
Figure 6:
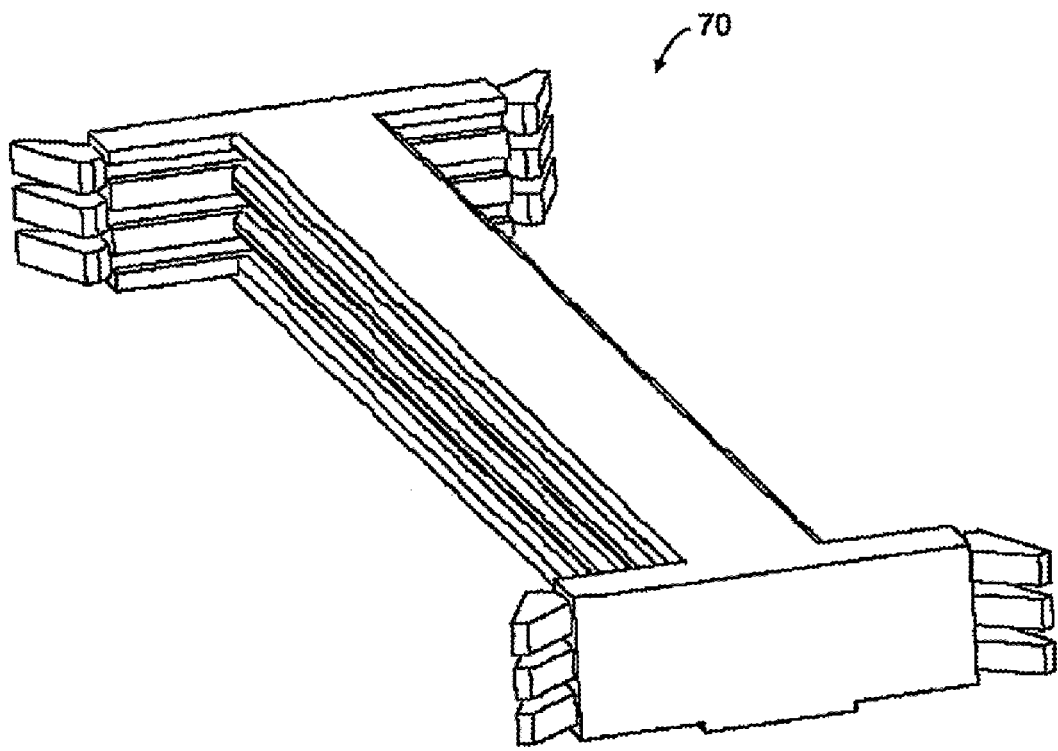
Figure 7:
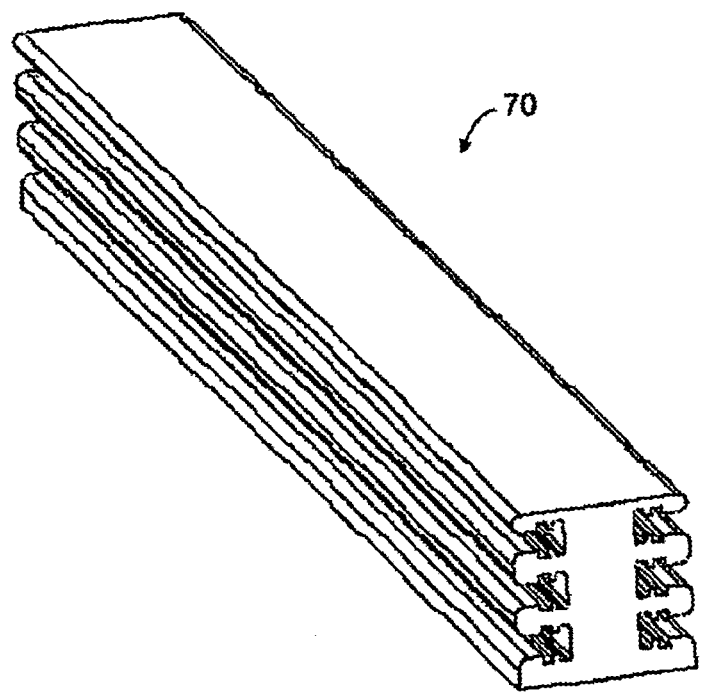
Figure 8:
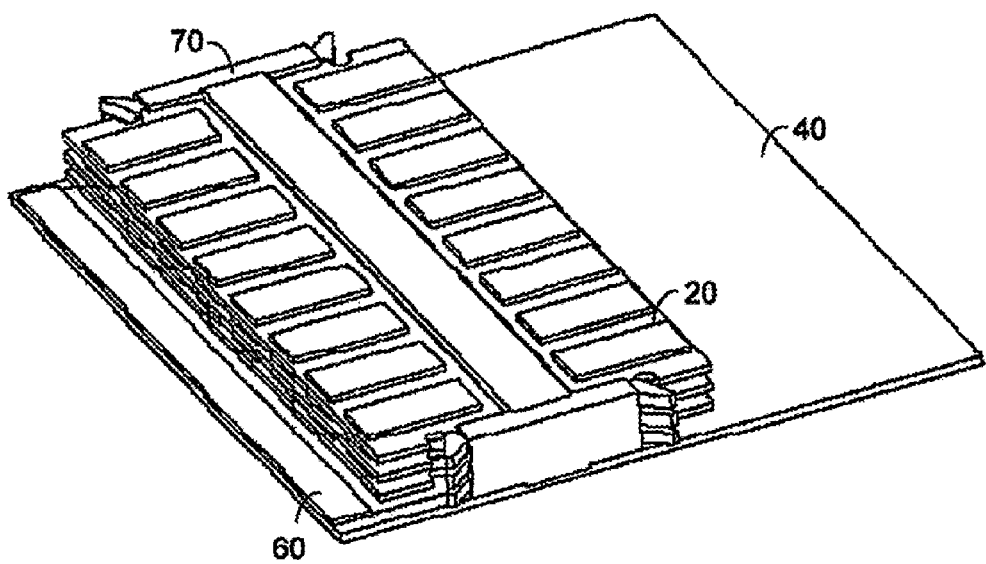
Figure 9:
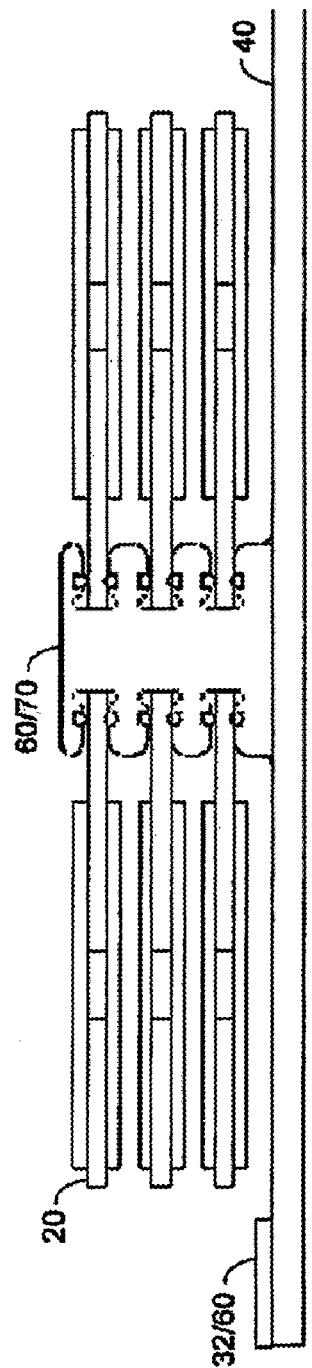
Figure 10:
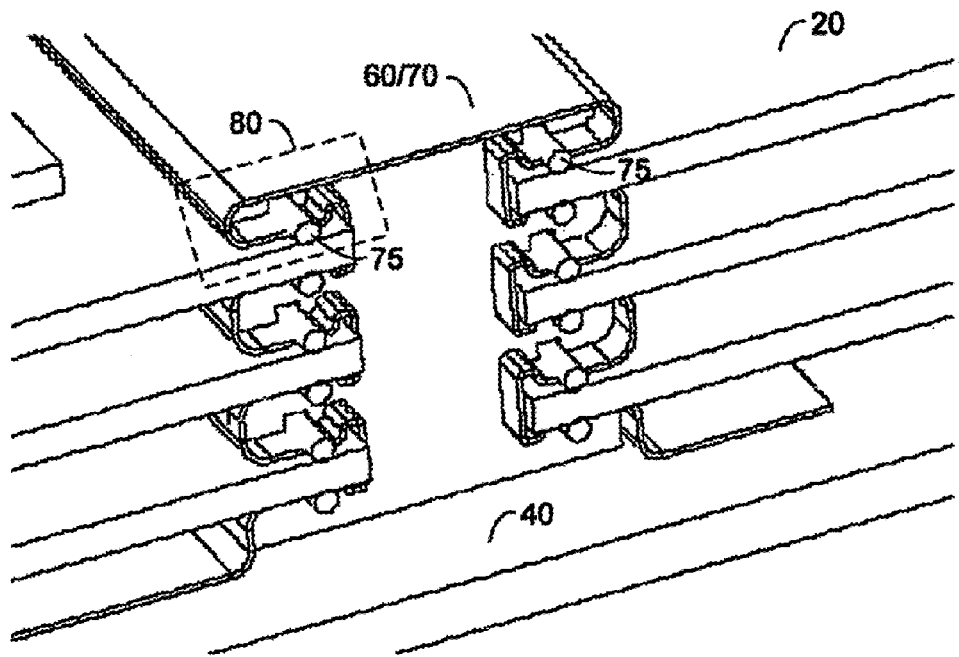
Figure 11:
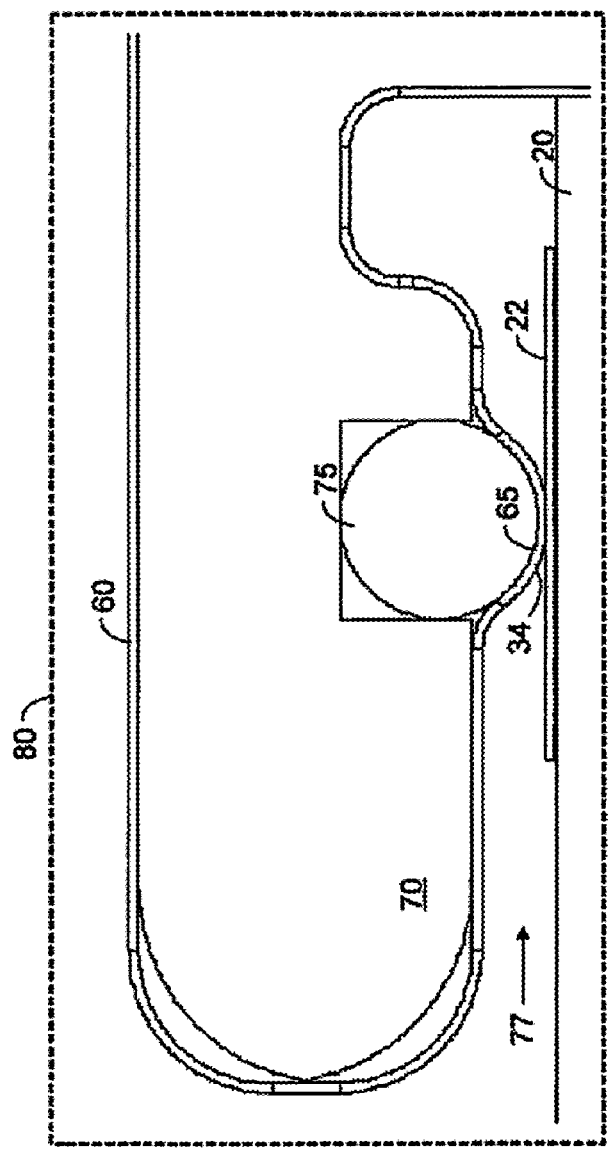
Figure 12:
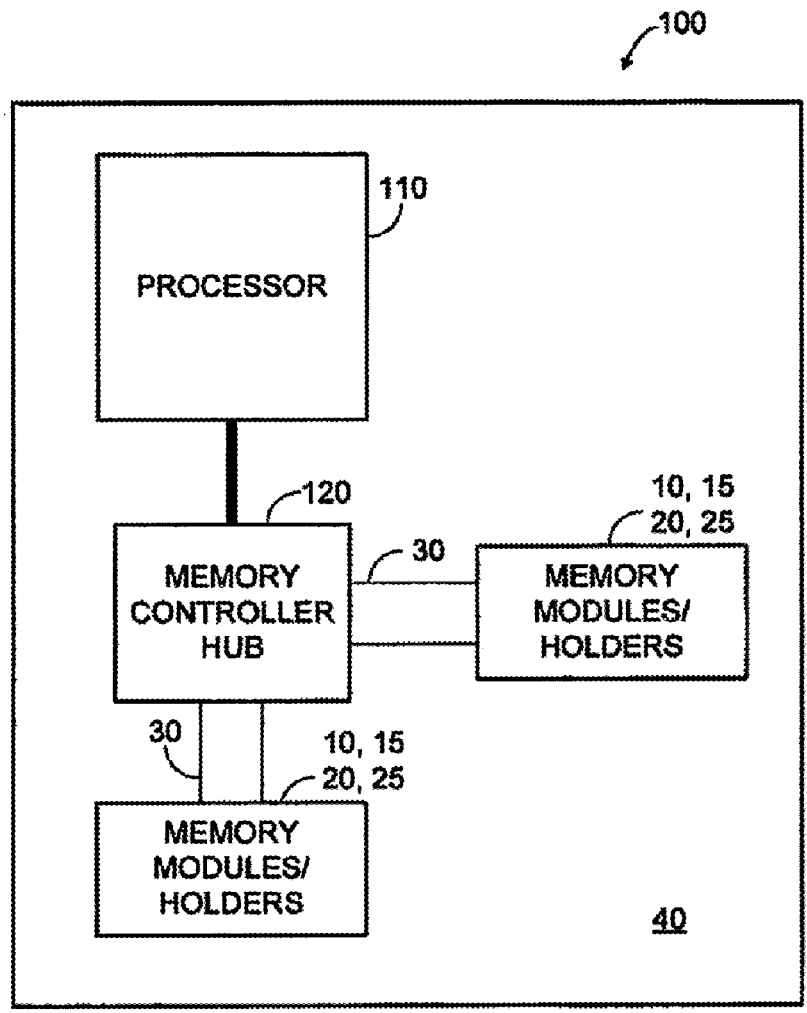

FIG. 15 is a block diagram illustrating device 130 according to some embodiments. FIG. 15 shows memory controller hub 154 in communication with device 130 over bus 155. Memory controller hub 154 receives address information, requests corresponding data from device 130 and provides the data to one or both of microprocessors 152 and 153.

Device 130 may receive a request and address information from hub 154 over bus 155. Device 130 retrieves corresponding data through memory cache interface 135 from one of modules 20 to which it is coupled if the received address information corresponds to one of the modules 20. As shown, device 130 may provide interfaces that support communication with different types of modules 20. If the address information corresponds to a downstream module 20 such as one coupled to device 131 or device 132, the request and address information are transmitted to an appropriate one of device 131 or device 132 over one of fan-out busses 136, 137, and 138. The request may include a tag that is returned to hub 154 along with any data resulting from the request. The tag may allow processor 152 or processor 153 to determine the request to which the data is in response.

The several embodiments described herein are solely for the purpose of illustration. Embodiments may include any currently or hereafter-known elements that provide functionality similar to those described above. Therefore, persons skilled in the art will recognize from this description that other embodiments may be practiced with various modifications and alterations.

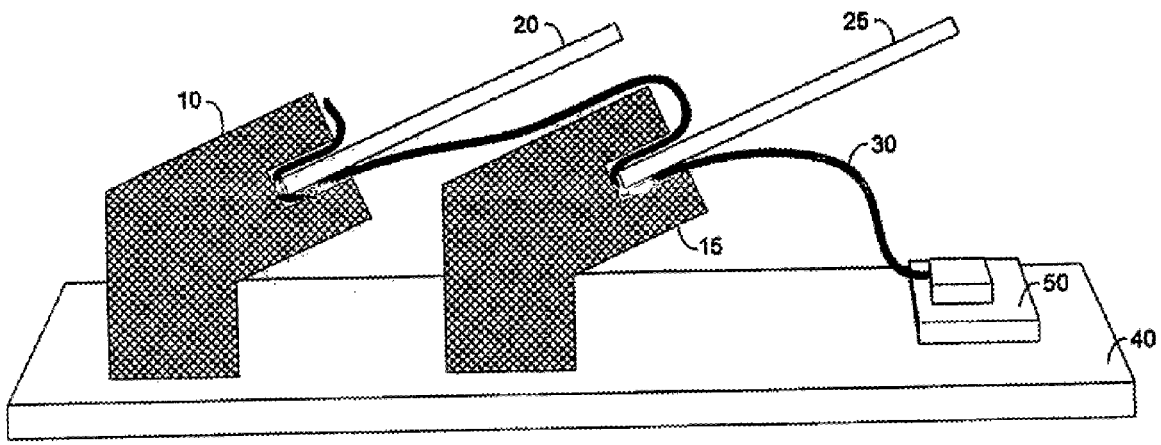

What is claimed is:

1. A system comprising:
   a substrate;
   a first holder coupled to a first location on the substrate, the first holder to hold a first module at a first acute angle with respect to the substrate, the first module comprising a first electrical circuit and a first conductive module pad electrically coupled to the first electrical circuit;
   a second holder coupled to a second location on the substrate, the second holder to hold a second module at a second acute angle with respect to the substrate, the second module comprising a second electrical circuit and a second conductive module pad electrically coupled to the second electrical circuit; and
   a flexible circuit coupled to the first holder and to the second holder, the flexible circuit comprising a first conductive pad to contact the first conductive module pad, and a second conductive pad to contact the second conductive module pad.

2. A system according to claim 1,
   wherein the flexible circuit is coupled to the substrate and is to carry signals from the substrate to the first electrical circuit and to carry signals from the substrate to the second electrical circuit.

3. A system according to claim 1, wherein the first holder is not electrically coupled to the first module and the second holder is not electrically coupled to the second module.

4. A system according to claim 1, wherein the first holder is not electrically coupled to the flexible circuit and the second holder is not electrically coupled to the flexible circuit.

5. A system according to claim 1, the flexible circuit comprising a third conductive pad and a fourth conductive pad,
   wherein the first and second conductive pads are disposed on a first side of the flexible circuit, and
   wherein the third and fourth conductive pads are disposed on a second side of the flexible circuit.

6. A system according to claim 1, the first holder further comprising a first pin and the flexible circuit defining a first hole, wherein the first hole is to receive the first pin to couple the flexible circuit to the first holder; and
   the second holder further comprising a second pin and the flexible circuit defining a second hole, wherein the second hole is to receive the second pin to couple the flexible circuit to the second holder.

7. A system according to claim 1, further comprising:
   the first module and the second module.

8. A system according to claim 1, wherein the first holder defines a first opening to receive a first portion of the flexible circuit, the first portion-comprising the first conductive pad and a first surface of the flexible circuit adjacent to and facing opposite from the first conductive pad,
   wherein the second holder defines a second opening to receive a second portion of the flexible circuit, the second portion comprising the second conductive pad and a second surface of the flexible circuit adjacent to and facing opposite from the second conductive pad,
   wherein the first holder comprises a first resilient element to contact the first surface, and wherein the second holder comprises a second resilient element to contact the second surface.

9. A system according to claim 1, further comprising:
a memory repeater hub physically coupled to the flexible circuit, the memory repeater hub to retrieve data stored by the module and to transmit the data in response to a request for the data.

10. A system according to claim 7, wherein the first module is a Dual In-line Memory Module and the second module is a Dual In-line Memory Module.

11. A system according to claim 8,
the first opening to receive the first conductive module pad and the first resilient element to press the first conductive pad against the first conductive module pad; and
the second opening to receive the second conductive module pad and the second resilient element to press the second conductive pad against the second conductive module pad.

12. A system according to claim 9, further comprising:
a second memory repeater hub; and
a third memory repeater hub, the memory repeater hub to forward the request to at least one of the second and the third memory repeater hubs.

13. A system according to claim 11, the first conductive module pad of the first holder to apply a force to the flexible circuit, the flexible circuit to compress the first resilient element and the first resilient element to generate a force to resist the compression; and
the second conductive module pad of the second holder to apply a force to the flexible circuit, the flexible circuit to compress the second resilient element and the second resilient element to generate a force to resist the compression.

14. A system according to claim 11, the first opening to receive a third portion of the flexible circuit, the third portion comprising a third conductive pad and a third surface of the flexible circuit adjacent to and facing opposite from the third conductive pad;
the second opening to receive a fourth portion of the flexible circuit, the fourth portion comprising a fourth conductive pad and a fourth surface of the flexible circuit adjacent to and facing opposite from the fourth conductive pad;
the first holder further comprising a third resilient element to contact the third surface, the third resilient element to press the third conductive pad against a third conductive module pad of the first electrical module; and
the second holder further comprising a fourth resilient element to contact the fourth surface, the fourth resilient element to press the fourth conductive pad against a fourth conductive module pad of the electrical module.

15. A system according to claim 12, wherein the second memory repeater hub is electrically coupled to the third memory repeater hub.

16. A system according to claim 14, the first resilient element and the third resilient element of the first holder to hold the first module in the first opening; and
the second resilient element and the fourth resilient element of the second holder to hold the second module in the second opening.

17. A system comprising:
a substrate;
a first Double Data Rate Dual In-line Memory Module comprising first electrical circuit and a first conductive module pad electrically coupled to the first electrical circuit;
a second Double Data Rate Dual In-line Memory Module comprising a second electrical circuit and a second conductive module pad electrically coupled to the second electrical circuit;
a first holder coupled to a first location on the substrate, the first holder to hold the first module at a first acute angle with respect to the substrate;
a second holder coupled to a second location on the substrate, the second holder to hold the second module at a second acute angle with respect to the substrate; and
a flexible circuit coupled to the first holder and to the second holder, the flexible circuit comprising a first conductive pad to contact the first conductive module pad; and a second conductive pad to contact the second conductive module pad.

18. A system according to claim 17, wherein the first holder is not
electrically coupled to the first module and the second holder is not electrically coupled to the second module.

19. A system according to claim 17, wherein the first holder is not electrically coupled to the flexible circuit and the second holder is not electrically coupled to the flexible circuit.

* * * * *

UNITED STATES PATENT AND TRADEMARK OFFICE
CERTIFICATE OF CORRECTION

| | | |
|---|---|---|
| PATENT NO. | : 7,038,920 B2 | |
| APPLICATION NO. | : 10/610097 | |
| DATED | : May 2, 2006 | |
| INVENTOR(S) | : Banyai et al. | |

It is certified that error appears in the above-identified patent and that said Letters Patent is hereby corrected as shown below:

The title page should be deleted and substitute therefore the attached title page.

Drawings:
Delete Drawing Sheets 1-12, and substitute therefore the Drawing Sheets, consisting of Figs. 1-12 as shown on the attached pages.

Signed and Sealed this

Fourteenth Day of November, 2006

JON W. DUDAS
*Director of the United States Patent and Trademark Office*

(12) United States Patent
Banyai et al.

(10) Patent No.: US 7,038,920 B2
(45) Date of Patent: May 2, 2006

(54) SYSTEM TO MOUNT ELECTRICAL MODULES

(75) Inventors: Christopher J. Banyai, Chandler, AZ (US); Karl H. Mauritz, Chandler, AZ (US); Edward Butler, Chandler, AZ (US); Mark D. Summers, Phoenix, AZ (US)

(73) Assignee: Intel Corporation, Santa Clara, CA (US)

( * ) Notice: Subject to any disclaimer, the term of this patent is extended or adjusted under 35 U.S.C. 154(b) by 343 days.

(21) Appl. No.: 10/610,097

(22) Filed: Jun. 30, 2003

(65) Prior Publication Data
US 2004/0264157 A1 Dec. 30, 2004

(51) Int. Cl.
*H05K 1/11* (2006.01)
*H05K 1/14* (2006.01)

(52) U.S. Cl. ............... 361/803; 361/785; 361/789; 439/67

(58) Field of Classification Search ............... 361/760, 361/720, 748–749, 789, 803; 439/77, 494, 439/637–638; 174/254–255
See application file for complete search history.

(56) References Cited

U.S. PATENT DOCUMENTS

| | | | |
|---|---|---|---|
| 4,984,064 A * | 1/1991 | Toshio et al. | 257/724 |
| 5,224,023 A * | 6/1993 | Smith et al. | 361/784 |
| 5,564,931 A * | 10/1996 | Fabian et al. | 439/62 |
| 5,703,760 A | 12/1997 | Zhu | |
| 6,302,704 B1 | 10/2001 | Belanger, Jr. | |
| 6,477,614 B1 * | 11/2002 | Leddige et al. | 711/5 |
| 6,498,731 B1 * | 12/2002 | Roscoe et al. | 361/796 |
| 6,765,800 B1 * | 7/2004 | Haba et al. | 361/760 |
| 2002/0181214 A1 | 12/2002 | Levy et al. | |

* cited by examiner

*Primary Examiner*—Kamand Cuneo
*Assistant Examiner*—Tuan Dinh
(74) *Attorney, Agent, or Firm*—Buckley, Maschoff & Talwalkar LLC

(57) ABSTRACT

According to some embodiments, a system includes a holder to hold an electrical module, the module having an electrical circuit and a conductive module pad electrically coupled to the electrical circuit. A system may also include a flexible circuit coupled to the holder and having a conductive pad to contact the conductive module pad.

19 Claims, 9 Drawing Sheets